May 8, 1951
H. E. ZASKE
2,551,782
REGULATOR AIR VENT GUARD
Filed Feb. 9, 1949
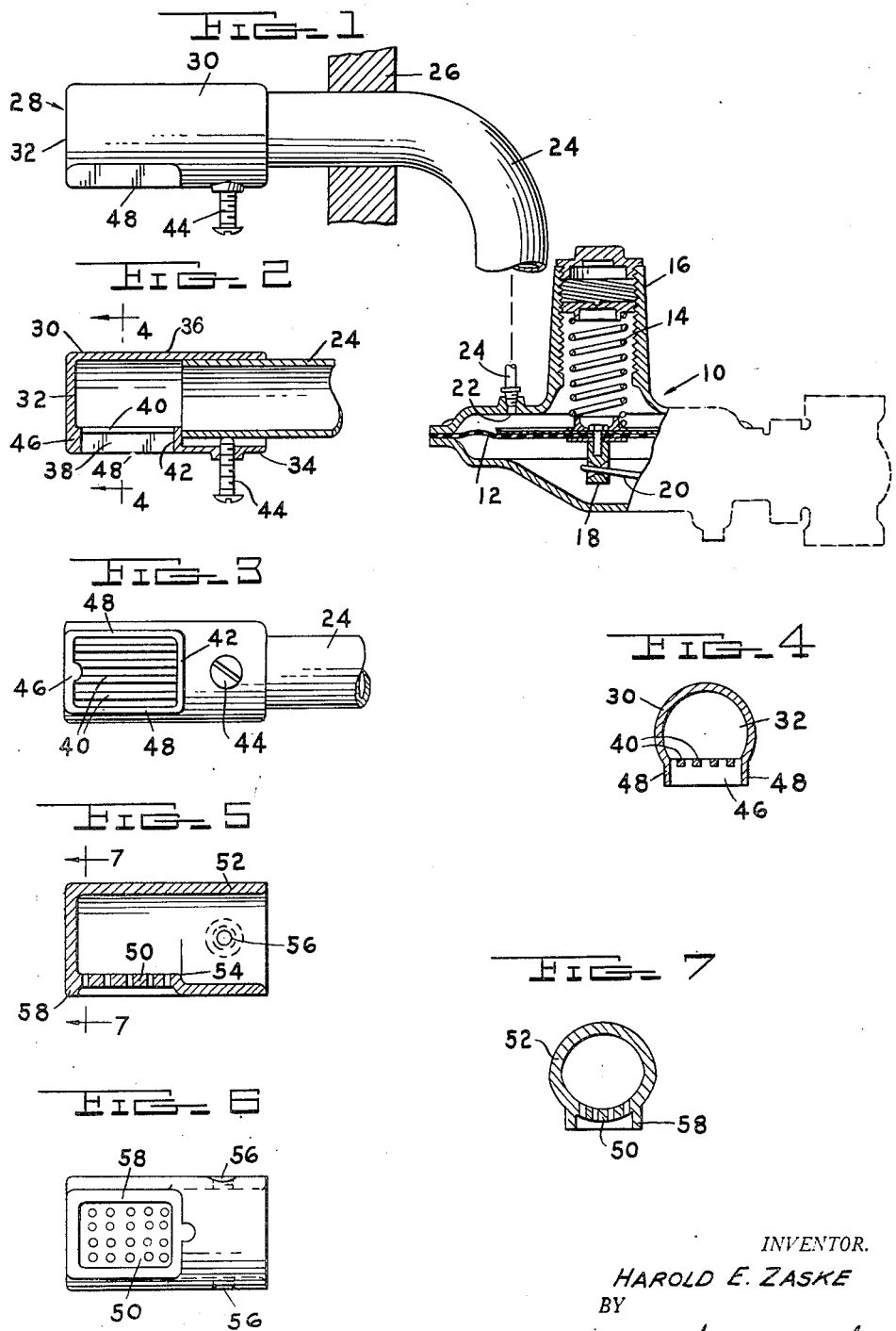
INVENTOR.
HAROLD E. ZASKE
BY
Burton & Parker
ATTORNEYS Patented May 8, 1951

2,551,782

UNITED STATES PATENT OFFICE 2,551,782

REGULATOR AIR VENT GUARD

Harold E. Zaske, Ferndale, Mich., assignor to Vent Guard Company, Royal Oak, Mich., a partnership Application February 9, 1949, Serial No. 75,469

3 Claims. (Cl. 98—122)

This invention relates to air vent guards and particularly to a guard for protecting the outer end of an air vent pipe of a gas service regulator. Heretofore, indoor gas pressure regulators have been provided with air vent pipes which projected through basement walls or other structural parts of buildings in order to discharge any gas that might accumulate in the regulator caused by a ruptured diaphragm as well as to admit air under atmospheric pressure to assist in the operation of the regulator. These pipes must necessarily be left open at all times or otherwise gas leaking from the regulator or impairment of the operation of the regulator to the extent of discharging gas through unlighted burners would cause an exceedingly dangerous condition to develop. Being accessible on the outside of buildings, the air admission opening of the vent pipe is very likely to become plugged up by weather conditions, insects or children. In the past some attempts have been made to remedy this condition by providing a metal screen over the air admission opening of the vent pipe but this required considerable amount of time and the use of skilled labor, and in many instances the screen was not predisposed in position to prevent it from being clogged by water freezing thereover.

An important object of this invention is to provide a compact guard device which is conveniently installable upon the outer end of such an air vent pipe, which does not require skilled labor and which is quickly and properly attached with a very minimum of labor. Another important object of the invention is to provide a guard of this character, the body of which is formed in one piece such that when properly installed it predisposes a screened opening in horizontal water protecting position on the underside of the guard. A further important object of the invention is to provide a one piece guard of this character which is provided with a grid preventing unauthorized tampering with the device and preventing large insects from entering the air vent and possibly blocking the same.

In carrying out the invention the guard is preferably a hollow cast metal body divided longitudinally into two sections, one end section of which is adapted to fit over the outer end of an air vent pipe and be secured thereto, and the other end section of which is constructed to provide a downwardly screened opening through which air is admitted. At the time the body is cast the downward opening is formed with small perforations which prevent large insects from entering the guard. A novel feature of the guard is the manner of casting a perforated or grid element across the air admission opening in a recessed condition such that the wall portions are formed which protectingly enclose the elements and prevent water from draining thereupon. Another important feature of the invention is the provision of an interior wall portion in the guard which not only serves to support the grid but also to limit the amount the guard may be fitted upon the air vent pipe preventing the pipe from overlapping upon the opening of the guard. A further important feature of the invention is the construction of the guard such that it may be cast in one piece for low cost manufacture and for quick and convenient installation.

Various other objects, advantages and meritorious features of the invention will become more fully apparent from the following specification, appended claims and accompanying drawings wherein:

Fig. 1 is a side elevation of a gas service regulator, partly broken away in section, and showing an air vent pipe therefor extending through the wall of a building and provided on the outer end thereof with the guard of the present invention, Fig. 2 is a longitudinal vertical sectional view showing the guard in place on the outer end of an air vent pipe, Fig. 3 is a bottom view of the guard on the outer end of an air vent pipe, Fig. 4 is a vertical cross sectional view taken along line 4—4 of Fig. 2, Fig. 5 is a longitudinal vertical sectional view of a modified form of guard for the air vent pipe of a gas service regulator, Fig. 6 is a bottom view of the guard of Fig. 5, and Fig. 7 is a vertical cross sectional view taken along line 7—7 of Fig. 5.

The invention is particularly adapted for air vent pipes leading to gas service regulators installed in basements of buildings and other structures, and with reference to Fig. 1 there is generally indicated at 10 a conventional gas regulator. The structure of the regulator forms no part of the present invention but for purpose of clarity, the regulator is partly broken away in section to show the provision of an interior diaphragm 12 dividing the upper and lower portions of the regulator into two chambers. The diaphragm is spring-pressed downwardly by means of spring 14 located in an upright housing 16. Depending from the diaphragm is a member 18 which is connected with a rocker arm or other operating element 20 for actuating a gas valve in the regulator. Communication is provided with the atmosphere in order to provide atmospheric pressure for one side of the diaphragm. For this purpose the regulator is provided with a port 22 into which one end of pipe 24 extends. The pipe 24 leads from the regulator and as shown in larger scale in Fig. 1 is usually bent to pass through a wall 26 which may be a basement wall of a building. The outer end of the pipe 24 projects horizontally from the wall of the building and without the provision of the guard usually opens directly outwardly from the wall with the axis of the opening extending horizontally. If no provision were made for protecting the air admitting opening of the pipe large insects, water, and other objects are likely to enter the pipe and clog the same.

It is the purpose of this invention to provide a readily installable self-operating guard for the opened end of the air vent pipe 24. The guard of the present invention is generally indicated at 28 and comprises a hollow metal body 30 shaped to fit the opened end of the pipe. The body is so designed that it may be readily cast in one piece in the formation shown. The body 30 of the guard is generally tubular in formation, being opened at one end for fit upon the outer end of the air vent pipe and closed by an end wall 32 at the opposite end. The body portion is divided longitudinally into two sections, one section indicated at 34 in Fig. 2 capable of fitting over the end of the air vent pipe, preferably with a slight clearance therebetween. The opposite end section 36 of the body 30 is provided with a relatively short downwardly directed passage terminating in an opening or aperture 38.

The opening 38 is relatively large as a comparison of Figs. 1, 2 and 3 will show and in order to prevent the entrance of large insects and other objects that might be intentionally forced thereinto the opening is crossed by a grating of the character shown in Fig. 3. The separate grid elements of the grating are indicated at 40 and in the modification of Figs. 1 to 4 inclusive extend in slightly spaced apart parallel relationship from one side of the opening to the other side thereof, and preferably longitudinally of the body 30. The grid elements are spaced apart insufficient for a large insect such as a bee or a hornet from entering and are located as shown in Figs. 2 and 4 in recessed relationship to the bottom end of the opening. The grid elements are cast integrally with the body 30 at the time the guard is formed and in order to provide support for one end thereof there is provided an upwardly projecting transverse ridge or wall portion 42 located approximately midway between the ends of the body 30 and serving as the means for dividing the interior into the two end sections 34 and 36 previously described. The inwardly projecting wall portion 42 is cast integrally with the balance of the guard and with the grid elements 40 so as to rigidly and immovably hold the latter in place in the body.

The inwardly projecting ridge or wall 42 also serves the function of preventing the air vent pipe 24 from overlapping upon the opening 38 and thereby obstructing the admission of air therethrough. For this purpose the wall 42 is constructed so as to extend inwardly toward the opposite wall such that the distance therebetween is less than the outside diameter of the pipe 24. When the guard is fitted on the pipe as shown in Fig. 2 the latter will abut the wall 42 and prevent the guard from being telescoped further upon the pipe.

In order that the guard may be adapted for pipes of different sizes as well as to expedite the fit thereof upon the pipe, the end section 34 of the guard is made slightly oversize the pipe. Extending through the end section 34 is a screw member 44 which is threaded thereinto. It is obvious that upon threading the screw inwardly it will abut the air vent pipe and secure the guard thereto. In place of a screw member of the type shown, an Allen set screw may be used which in its fully threaded condition will extend substantially flush with the outside surface of the body.

As previously mentioned the inwardly projecting wall 42 supports one end of the grid elements in recessed condition in the body. The outer end wall 32 of the body is provided with a depending flange 46 which together with side flanges 48 and the wall portion 42 enclose the grid elements on all four sides thereof. These flanges project below the grids and in the event of water falling upon the guard they will function to drain off the water without allowing it to flow upon the grids. In freezing weather this will prevent water from collecting on the grid and freezing thereon.

Figs. 5, 6, and 7 illustrate a modification of the invention wherein in place of the grid elements 40 perforated plate 50 is provided across the air admitting opening of the guard. The plate 50 is cast integrally with the body 52 of the guard and is disposed in slightly recessed condition in order to prevent water from collecting thereon in the manner previously described. The inner end of the plate 50 is integrally connected to and supported by an inwardly projecting wall 54 which corresponds to wall 42 previously described. When the guard is fitted upon an air vent pipe, the latter will abut the wall 54 preventing the guard from being further telescoped upon the pipe. In place of a single screw member for attaching the guard to the pipe, the embodiment of the invention in Figs. 5, 6 and 7 is provided with two countersunk side apertures 56—56 through which conventional Allen set screws may be threaded for securing the guard in place on the pipe. The perforated plate, as previously mentioned, is recessed above the lower side of the guard and as a result there is provided a depending flange 58 extending around the perforated opening as shown in Figs. 6 and 7.

What I claim is:

1. A guard for protecting the open end of an air vent pipe of a gas regulator comprising, in combination, a one-piece cast tubular body closed at one end and opened at the other end, the open end section of the body having an internal diameter slightly greater than the external diameter of the vent pipe in order to be telescopingly fitted thereon, means for clamping the open end section of the body to a vent pipe received therewithin, the end section of the body adjacent to the closed end thereof being provided with a downwardly opening aperture, an internal projection cast integrally with the body and located substantially at the mid-section thereof, the clearance between the inner end of the projection and the opposite wall of the body being less than the external diameter of the vent pipe upon which the guard is fitted so as to serve as an abutment therefor limiting the telescoping movement of the body on the vent pipe, said body having a perforated section cast integrally therewith and extending horizontally across said aperture, said perforated section being disposed in spaced relation above the edge of body forming said aperture to provide a depending wall portion completely around the section for preventing the drainage of water thereacross.

2. A guard for protecting the open end of an air vent pipe of a gas regulator comprising, in combination, a one-piece cast tubular body closed at one end and opened at the other end, the opened end section of the body having an internal diameter slightly greater than the external diameter of the vent pipe for which the guard is intended in order to telescopingly fit over the same, means for clamping the open end section of the body to the vent pipe received therewithin, the closed end section of the body having a downwardly opening aperture of rectangular formation, a transverse wall in the interior of the body located on the bottom side thereof and between the end sections thereof, said transverse wall being cast integrally with the body and projecting upwardly from the bottom side and terminating in a free edge spaced from the upper opposite side of the body a distance less than the external diameter of the vent pipe so as to form an abutment for the vent pipe limiting further telescoping movement of the vent pipe into the body, longitudinally extending spaced apart grid elements cast integrally with the body and horizontally bridging said aperture, one end of each of said grid elements being integrally connected to the closed end of the body and the opposite end of each of said grid elements being integrally connected to said transverse wall, said grid elements being disposed in a horizontal plane spaced upwardly from the edge of the body forming said aperture so as to provide a depending wall portion completely around the grid elements for preventing the drainage of water thereacross.

3. A gas regulator air vent pipe guard comprising, in combination, a one-piece cast tubular body divided longitudinally into two integrally connected end sections, one of said sections having its end opened and being shaped to telescopingly fit over an air vent pipe of a gas regulator, the other of said sections having its end closed by an end wall, a transversely extending ridge in the interior of the body on the dividing line of said two end sections, said ridge projecting upwardly from the bottom side of the body and rising to a height therein sufficient to form an internal abutment against which the vent pipe strikes when the opened end section of the body is telescopingly fitted thereon, the underside of said closed end section of the body having a downwardly opening passage between said end wall and said ridge, and a perforated section cast integrally with the body and extending horizontally across said passage, said perforated section being supportingly connected at its opposite ends to said end wall and to said ridge and being disposed in a horizontal plane spaced above the lower end of the passage to prevent drainage of water thereon when the guard is mounted on an air vent pipe.

HAROLD E. ZASKE.

REFERENCES CITED

The following references are of record in the file of this patent:

UNITED STATES PATENTS

| Number | Name | Date |
| --- | --- | --- |
| 718,657 | Renton | Jan. 20, 1903 |
| 1,166,005 | Robinett et al. | Dec. 28, 1915 |
| 1,260,538 | Hedges | Mar. 26, 1918 |
| 1,887,119 | Cornell, Jr. | Nov. 8, 1932 |
| 2,184,110 | Anderson | Dec. 19, 1939 |
| 2,248,329 | Bell, Jr. | July 8, 1941 |
| 2,447,472 | Donley | Aug. 17, 1948 |
| 2,466,307 | Di Renna | Apr. 5, 1949 |
| 2,470,799 | Ames | May 24, 1949 |